United States Patent
Takagi et al.

(10) Patent No.: US 7,182,998 B2
(45) Date of Patent: Feb. 27, 2007

(54) HEAT-SHRINKABLE FILM

(75) Inventors: Naoki Takagi, Suzuka (JP); Akinori Takeda, Suzuka (JP)

(73) Assignee: Asahi Kasei Kabushiki Kaisha, Osaka (JP)

( * ) Notice: Subject to any disclaimer, the term of this patent is extended or adjusted under 35 U.S.C. 154(b) by 0 days.

(21) Appl. No.: 10/148,635

(22) PCT Filed: Oct. 30, 2001

(86) PCT No.: PCT/JP01/09519

§ 371 (c)(1),
(2), (4) Date: Jun. 4, 2002

(87) PCT Pub. No.: WO02/36666

PCT Pub. Date: May 10, 2002

(65) Prior Publication Data

US 2002/0192437 A1 Dec. 19, 2002

(30) Foreign Application Priority Data

Nov. 1, 2000 (JP) .................... 2000-334629
Apr. 20, 2001 (JP) .................... 2001-122762

(51) Int. Cl.
B22B 27/32 (2006.01)
B65D 65/40 (2006.01)
C08T 5/18 (2006.01)

(52) U.S. Cl. ........... 428/220; 264/209.3; 264/209.5; 264/236; 264/564; 428/516; 428/517; 428/521; 428/523; 428/910

(58) Field of Classification Search ........... 428/219, 428/220, 516, 517, 521, 523, 910; 264/209.3, 264/209.5, 236, 564
See application file for complete search history.

(56) References Cited

U.S. PATENT DOCUMENTS

| | | | |
|---|---|---|---|
| 5,132,074 A | 7/1992 | Isozaki et al. | 264/564 |
| 5,145,728 A | 9/1992 | Itaba et al. | 428/213 |
| 5,306,549 A | 4/1994 | Isozaki et al. | 428/220 |
| 5,443,765 A | 8/1995 | Yoshimura et al. | 264/22 |
| 5,766,772 A | 6/1998 | Ciocca et al. | 428/516 |
| 6,489,016 B2 * | 12/2002 | Kishine | 428/213 |
| 6,514,583 B1 * | 2/2003 | Ahlgren et al. | 428/34.9 |

FOREIGN PATENT DOCUMENTS

| | | |
|---|---|---|
| EP | 0319258 A2 | 6/1989 |
| EP | 0613772 A1 | 9/1994 |
| JP | 01141936 | 6/1989 |
| JP | 01165422 | 6/1989 |
| JP | 01168426 | 7/1989 |
| JP | 2-52624 B2 | 11/1990 |
| JP | 03138148 | 6/1991 |
| JP | 3-231928 A | 10/1991 |
| JP | 6-226925 A | 8/1994 |
| JP | 7-9640 A | 1/1995 |
| JP | 8-80565 A | 3/1996 |
| JP | 09039179 | 2/1997 |
| JP | 9-216956 A | 8/1997 |
| JP | 10-244638 A | 9/1998 |
| JP | 11-192679 A | 7/1999 |
| JP | 11-286087 A | 10/1999 |
| JP | 2000109572 | 4/2000 |
| JP | 2000127315 | 5/2000 |
| JP | 2001-48229 A | 2/2001 |

* cited by examiner

*Primary Examiner*—D. S. Nakarani
(74) *Attorney, Agent, or Firm*—Birch, Stewart, Kolasch & Birch, LLP

(57) ABSTRACT

Disclosed is a cross-linked heat shrinkable film comprising an ethylene polymer resin which has a gel fraction of 5–40%. Furthermore, this film contains a glycerin fatty acid ester surface active agent in an amount of 2.0–8.0% by weight based on the total weight of the ethylene polymer resin, said surface active agent being present in an amount of 3.0–20.0 mg/m$^2$ on at least one surface of the film. This film has characteristics adaptable to speeding-up of continuous packaging machines, namely, a proper coefficient of dynamic friction and hot tack sealability, with maintaining appearance of the film after being shrunk, such as heat shrink characteristics, fog resistance and gloss.

7 Claims, No Drawings

HEAT-SHRINKABLE FILM

This application is the national phase under 35 U.S.C. §371 of PCT International Application No. PCT/JP01/09519 which has an International filing date of Oct. 30, 2001, which designated the United States of America.

TECHNICAL FIELD

The present invention relates to a heat shrinkable film which can give good appearance packages by heat shrinking. Particularly, it relates to a heat shrinkable film excellent in balance in fog resistance, optical characteristics and physical properties for adaptability to packaging machines and, additionally, sealability on high-speed packaging machines.

BACKGROUND ART

Methods of packaging with films include, for example, household wrap packaging, twist packaging, sack packaging, skin packaging, shrink packaging, stretch packaging, and the like. Among them, since the shrink packaging can package tightly the articles to be packaged and can enhance the commercial value of packages, this method is suitably used for packaging of foods, miscellaneous goods, etc. Heat shrinkable films used for the shrink packaging are required to have the following characteristics: (1) they can tightly finish the package without causing deformation of the articles to be packaged; (2) they are low in haze and high in gloss, and can finish the package with beautiful appearance of contents; (3) they are not hazed with water droplets in refrigeration and are superior in visibility of the contents; and others.

In addition, for continuous shrink packaging of a plurality of articles, in general, the articles are primarily packaged by pillow packaging or overlap packaging with leaving some allowance between the film and the article, and then the packaged articles are passed through a heat shrink tunnel to heat shrink the film.

Recently, packaging by continuous packaging machines has been speeded up, and hence, the characteristic required for heat shrinkable films used for the packaging have become severer. Main characteristics required for heat shrinkable films used on continuous packaging machines are as follows:

(4) With speeding-up of continuous packaging machines, the films must be superior in slipperiness between the machines and the films.

(5) They must have hot tack sealing strength to perform firm sealing in a short time.

As heat shrinkable films, there are known multi-layer films comprising various ethylene polymers. For example, JP-A-5-131599 discloses a polyethylene heat shrinkable laminate film excellent in adaptability to packaging machines which contains in inner, outer and intermediate layers a linear low density polyethylene specified in density and melt index.

Furthermore, JP-A-5-105787 discloses a resin composition for films which comprises a mixed resin of a linear low density polyethylene and a low density ethylene-α-olefin copolymer specified in melt index to which a specific amount of an anti-fogging agent is added.

On the other hand, JP-A-6-106668 discloses a cross-linked film comprising an ethylene polymer resin having proper heat shrinkage, heat shrinkage stress and tear strength and excellent in transparency.

However, these films have the following problems.

The film disclosed in JP-A-5-131599 is excellent in sealability, but inferior in heat resistance, and the temperature of heat shrink tunnel or heat sealing temperature cannot be high. For these reasons, the film has a restriction in packaging conditions for performing high-speed packaging.

AS for the film disclosed in JP-A-5-105787, enhancement of fog resistance is aimed at by improving bleeding-out of surface active agent, but no sufficient fog resistance has been obtained. Moreover, since this film is cross-linked, raising of heat sealing temperature is apt to cause failure in sealing due to fusion bonding of the film to a sealing bar or extension of sealed portions. Therefore, this film cannot be applied to high-speed continuous packaging machines.

The film disclosed in JP-A-6-106668 is a cross-linked and stretched film, and hence, is improved in heat resistance and has proper heat shrinkage and heat shrinkage stress, and further is good in sealability. However, since the film is insufficient in slipperiness, it is apt to be broken when the continuous packaging machine is operated at high speed. In addition, the film is insufficient in fog resistance.

The object of the present invention is to provide a heat shrinkable film which satisfies characteristics to be adapted for speeding-up of continuous packaging machines, namely, proper coefficient of dynamic friction and hot tack sealability with keeping heat shrink characteristics and appearance after shrinking, such as fog resistance and gloss.

DISCLOSURE OF INVENTION

As a result of intensive research conducted by the inventors in an attempt to attain the above object, the present invention has been accomplished.

That is, the present invention is a cross-linked heat shrinkable film comprising an ethylene polymer resin where the film has a gel fraction of 5–40% and contains a glycerin fatty acid ester surface active agent in an amount of 2.0–8.0% by weight based on the total weight of the ethylene polymer resin, said surface active agent being present in an amount of 3.0–20.0 mg/m$^2$ on at least one surface of the film.

Furthermore, a method for producing the heat shrinkable film of the present invention includes the steps of kneading an ethylene polymer resin and a glycerin fatty acid ester surface active agent using an extruder, molding an unstretched tube, cross-linking the resulting unstretched tube, and stretching the tube, wherein at least a part of the kneading step is carried out at a temperature of 250° C. or higher and at a shear rate of 50 [1/sec] or higher.

BEST MODE FOR CARRYING OUT THE INVENTION

The present invention will be explained in detail below.

First, the heat shrinkable film of the present invention is a cross-linked film comprising an ethylene polymer resin.

As the ethylene polymer resin, mention may be made of resins comprising copolymers of ethylene and α-olefins, such as high density polyethylene, intermediate density polyethylene, low density polyethylene, linear low density polyethylene and ultra-low density polyethylene; resins comprising copolymers of ethylene and vinyl compounds copolymerizable with ethylene, such as ethylene-vinyl acetate copolymer, and the like.

Of these ethylene polymer resins, linear low density polyethylene and ultra-low density polyethylene which are produced by polymerization using Ziegler multi-site catalysts or single-site catalysts such as metallocene catalysts are preferred because they are excellent in uniformity of cross-linking, stretching stability, transparency, slipperiness, and sealability.

Moreover, when amount of a low-molecular weight component, namely, a component of not more than 10,000 in molecular weight, is 10% by weight or less in the ethylene polymer resins, ethylene chains which contain less short chains are obtained. Therefore, cross-linking degree can be readily adjusted and slipperiness and hot tack sealability after molding into films are improved. These resins can be obtained by using single-site catalysts (hereinafter, these resins being sometimes referred to as "single-site resins" or "SSC resins"). Examples of these resins are "Evolue" (trademark) manufactured by Mitsui Chemical Co., Ltd., "UMERIT" manufactured by Ube Industries, Ltd., "Elite" (trademark) manufactured by Dow Chemical Co., Ltd., and the like.

Furthermore, in the present invention, it is more preferred to use, as the ethylene polymer resin, a linear low density polyethylene or ultra-low density polyethylene in which α-olefin is hexene-1 or octene-1.

Density [ρ] of the ethylene polymer resins is preferably 0.900–0.934 g/cm$^3$. When the density is within this range, a proper stiffness is given to the film, and film thickness can be made thin, and, besides, more transparent film can be obtained. The density of the ethylene polymer resins is more preferably 0.910–0.927 g/cm$^3$.

In order to obtain good optical characteristics even for such films as stretched at high ratios and at high temperatures, MI of the ethylene polymer resins is preferably 0.5–5.0, more preferably 0.8–4.0.

The heat shrinkable film of the present invention is preferably a laminate film comprising at least 3 layers composed of outer layers and an inner layer.

The ethylene polymer resin used for the outer layers is preferably an ethylene copolymer resin, and from the points of hot tack sealability and optical characteristics, the density of the resin is preferably 0.904–0.927 g/cm$^3$, more preferably 0.910–0.918 g/cm$^3$. It is especially preferred to use an ethylene-α-olefin copolymer, a low density polyethylene or mixtures thereof as the ethylene copolymer.

Particularly, when a mixed resin of an ethylene-α-olefin copolymer and a low density polyethylene is used, fine crystals are dispersed in the resin and hence, a film layer in which the surface active agent uniformly bleeds out can be obtained. Moreover, the mixed resin is also preferred because of diminishment in generation of foreign matters which is apt to occur when the ethylene-α-olefin copolymer resin is stirred under the conditions of high temperature and high speed. In the case of using a low density polyethylene as the ethylene copolymer resin, the amount thereof is preferably 4–30% by weight based on the weight of resin in the total outer layers. Furthermore, when an ethylene-α-olefin copolymer obtained using a single-site catalyst (SSC resin) is used, the slipperiness is very good and hence, use of this ethylene-α-olefin copolymer is especially preferred.

The ethylene polymer resin used for the inner layer preferably has a density of 0.913–0.927 g/cm$^3$, because this resin is high in efficiency of cross-linking with electronic rays and high in melt tension at the time of heating, and hence, is highly improved in stability at stretching. It is particularly preferred to use an ethylene-α-olefin copolymer resin or a mixture of an ethylene-α-olefin copolymer and a low density polyethylene. When the ethylene-α-olefin copolymer is one obtained using a single-site catalyst, the copolymer has a structure of many molecular chains being present in a main chain and, therefore, is high in film-forming stability. Further, from the point of stretching stability, it is preferred to use a mixed resin of a linear low density polyethylene and a low density polyethylene as the ethylene polymer resin. In the case of using a low density polyethylene as the ethylene polymer resin, amount of the low density polyethylene is preferably 4–30% by weight based on the weight of the resin in the total inner layer.

The above ethylene polymer resin may contain a small amount of a low density polyethylene or a comonomer as an auxiliary component.

As mentioned above, the heat shrinkable film of the present invention comprises a cross-linked ethylene polymer resin. When a properly cross-linked ethylene polymer resin is made to a heat shrinkable film, a stable stretching can be performed even at a temperature higher than the melting point of the resin, control of stretching temperature and stretching ratio becomes easy, and thus a heat shrinkable film having a low heat shrinkage stress is obtained with keeping a high heat shrinkage.

Specifically, it is necessary to cross-link the ethylene polymer resin so that the gel fraction of the film which is an indication for cross-linking degree is in the range of 5–40%. If the gel fraction of the film is less than 5%, it sometimes becomes difficult to stably form the film at the time of stretching at high temperatures. If it exceeds 40%, the heat shrinkage stress becomes too high, and soft articles to be packaged are sometimes deformed. When the gel fraction of the film is within the above range, in addition to the above-mentioned points, haze of the heat shrinkable film after being shrunk can be improved, and furthermore when the film is shrunk by heating at a temperature higher than the melting point of the resin which constitutes the film, the film can be prevented from melting and breaking.

In the present invention, the gel fraction of the film is more preferably 10–40%. The gel fraction is especially preferably 15–35%, because stretching is stabilized and a suitable heat shrinkage stress can be obtained.

The film is cross-linked by irradiating the film with ionizing radiation such as α-rays, β-rays, γ-rays, neutron rays, electron rays, and the like. Degree of irradiation is preferably 2–10 megarads. Within this range, degree of the haze of the film after subjected to heat shrinking is proper while the heat shrinkage stress of the film is low, and thus, beautiful shrink packaged articles can be provided. If irradiation of higher than 10 megarads is carried out, heat shrinkage stress of the film becomes too large upon stretching, and as a result the film breaks at the portions of small holes provided for removal of air, the sealed portions are peeled, or the articles to be packaged are deformed, and hence, beautiful shrink packaged articles cannot sometimes be obtained.

Considering also the conditions under which mechanical unevenness such as in thickness and flow speed of the film does not occur, the degree of irradiation is more preferably 4–8 megarads. Since the relation between the degree of irradiation and the resulting gel fraction differs depending on the kind of resin, the irradiation dose is set depending on the resin used.

Next, a glycerin fatty acid ester surface active agent is present in or on the surface of the heat shrinkable film of the present invention.

The glycerin fatty acid ester surface active agent (which may be hereinafter referred to as merely "surface active agent") is an ester of a polyhydric alcohol and a fatty acid, and hydrophilicity and oleophilicity thereof can be controlled by changing polymerization degree of glycerin, kind of the fatty acid or esterfication degree. By allowing the surface active agent to be present on the surface of the film, fog resistance can be given to the film. More preferred surface active agents are those which are mainly composed of diglycerin oleate, diglycerin laurate, glycerin monooleate or mixtures thereof because they hardly damage slipperiness and optical characteristics of the film. It is especially preferred to use a mixture consisting of diglycerin oleate and glycerin monooleate at 1:1 as the surface active agent.

The characteristics of the heat shrinkable film of the present invention vary depending on the kind of the ethylene polymer resin, the amount of the surface active agent, the kind of the surface active agent, and the blending ratio of the surface active agent and the ethylene polymer resin. Therefore, a heat shrinkable film capable of attaining the more preferable effects can be obtained by selecting a specific ethylene polymer resin and a specific surface active agent, and adjusting the amount of the surface active agent and the blending ratio of the surface active agent and the ethylene polymer resin to specific ranges. As one example of the most preferred embodiments in the present invention, mention may be made of a film of three layers comprising a laminate of outer layers and inner layer as shown below.

The outer layers comprise a mixture of an ethylene-hexene-1 copolymer (70–96% by weight) obtained using a single-site catalyst and a low density polyethylene (4–30% by weight), and both the outer layers contain a surface active agent mainly composed of diglycerin oleate and glycerin monooleate.

The inner layer comprises a mixture of ethylene-octene-1 copolymer (70–96% by weight) obtained using a multi-site catalyst and a low density polyethylene (4–30% by weight), or a mixture of a resin (70–96% by weight) mainly composed of an ethylene-hexene-1 copolymer obtained using a single-site catalyst and a low density polyethylene (4–30% by weight).

The conventional techniques according to which the surface active agent is only coated on the surface of the film have the problems that the film is poor in retention of fog resistance and, further, the amount of the surface active agent present on the surface of the film (hereinafter referred to as "amount on film surface" is difficult to control. On the other hand, according to the present invention, these problems are solved by allowing the surface active agent to bleed out at a high concentration on the surface of the film.

Moreover, it is preferred that the surface active agent is present on the surface of the film not in the state of droplets, but in the state of a band, namely, in nearly continuous state. That the surface active agent is present in the state of a band means that the surface active agent is present on the surface of the film without causing exposure of the film substrate and, besides, is also present in the portion of the film which is in the vicinity of the surface in the continuous state, in other words, is present in continuous state both inside and outside the film with the surface of the film constituting an interface between the outside and the inside. The surface active agent band may not necessarily be present with uniform thickness and thickness of the surface active agent band may have unevenness in conformity to the irregularities of the film substrate. The higher fog resistance and slipperiness can be attained by allowing the surface active agent to be present in the form of a band on the film surface as mentioned above.

The bleeding-out is an important factor differing in its effect depending on the amount and the state of presence of the surface active agent, and in the heat shrinkable film of the present invention, 3.0–20.0 g/m$^2$, preferably 5.0–15.0 g/m$^2$ of the glycerin fatty acid ester type surface active agent must be present on the surface of the film. If the amount of the surface active agent is less than 3.0 g/m$^2$, the film is sometimes inferior in fog resistance and slipperiness. If it exceeds 20.0 g/m$^2$, optical characteristics and slipperiness are sometimes deteriorated for some kind of the surface active agents.

Amount (content) of the surface active agent added to the ethylene polymer resin is 2.0–8.0% by weight, preferably 2.0–5.0% by weight based on the total weight of the ethylene polymer resin which constitutes the film, taking into consideration the condition that the surface active agent is allowed to be present in an amount of 3.0–20.0 mg/m$^2$ desirably in the state of a band on the surface of the film.

As to whether the material distributed on the surface of the film is the glycerin fatty acid ester surface active agent or other additives, the distribution of chemical species or functional groups on the surface of the film, for example, hydroxyl group and the like of the glycerin fatty acid ester surface active agent is identified by carrying out mapping with use of analytical methods such as time-of-flight method type secondary ion-mass spectrography (Tof-SIMS) or microscopic infrared spectroscopic analysis (ATR).

Furthermore, whether the glycerin fatty acid ester surface active agent is present in the form of a band or not can be confirmed by observing the state of distribution of the surface active agent on the film surface in dynamic mode using a scanning type probe microscope such as Nanoscope IIA manufactured by Digital Instruments Co., Ltd. or SPM-9500-WET-SPM series manufactured by Shimadzu Seisakusho, Ltd.

There are contact mode and dynamic mode in the measuring modes of scanning type probe microscopes, and in the present invention, measurement is conducted in the dynamic mode. The dynamic mode is called vibration mode or tapping mode and this mode makes it possible to observe a soft sample which cannot be observed well in the contact mode. Specifically, whether the material present on the surface of the film is in the form of droplets or a continuous band can be simply visually recognized on the image plane by observing (100–3000 magnifications) the images of irregularities in the dynamic mode of a scanning type probe microscope.

Detailed method of the observation will be explained later.

Thickness in the direction of band of the surface active agent band is preferably 3–50 nm, more preferably 5–25 nm.

The thickness in the direction of band of the glycerin fatty acid ester surface active agent band is measured by catching the difference in elasticity or adsorbability (cohesive force) of the surface active agent band and the film surface by a cantilever. Specifically, first, samples of 10 mm square are prepared from the film so as not to scratch the surface and the whole surface of the samples is observed with a microscope. For the observation, it is more preferred to observe samples of several portions of the same film, for example, portions in winding direction and width direction.

Moreover, liquid additives such as surface active agents other than the glycerin fatty acid ester surface active agents, antioxidants, antistatic agents, petroleum resins, and mineral oils may be added to the ethylene polymer resin in such an amount as not damaging the fog resistance.

Thickness of the heat shrinkable film of the present invention is preferably 5–30 μm, and within this range, optical characteristics and hot tack sealing strength after heat shrinking are superior. A thickness of 8–15 µm is more preferred because optical characteristics are superior and, moreover, production cost is low.

Packaging speed of continuous packaging machines is conventionally about 20–40 packages for 1 minute while about 60–80 packages can be finished for 1 minute by the recent high-speed continuous packaging machines. Therefore, heat shrinkable films are strongly demanded to have adaptability to the packaging speed, such as slipperiness, hot tack sealability and heat shrink characteristics. For imparting these characteristics to the film of the present invention, the film preferably has the following physical properties.

First, the heat shrinkage (shrinkage percentage) of the film will be explained. The heat shrinkage is preferably 50–80% in both the machine direction and the transverse direction when measured at 120° C. in accordance with ASTM D-2732. When shrink-packaging is carried out with a heat shrinkable film having such heat shrinkage, the package can be finished tightly and beautifully. Furthermore, a beautiful packaging can be performed with a film having a heat shrinkage in the range of 55–80%, even if the articles to be packaged are round or circular. In order to adjust the heat shrinkage of the heat shrinkable film of the present invention within the above range, there is a method of adjusting the gel fraction of the film to the range specified in the present invention and stretching at a high ratio (for example, 6 times or more) at a temperature higher than the melting point of the ethylene polymer resin.

Next, heat shrinkage stress of the film will be explained. The heat shrinkage stress of the heat shrinkable film of the present invention is preferably 1.2–2.2 N/mm$^2$ in both the machine direction and the transverse direction when measured at 120° C. in accordance with ASTM D-2838. Within this range, while the package is passed through a heat shrink tunnel, air can be easily removed from small holes, and furthermore, since the heat shrink occurs sufficiently, creases are hardly formed. Moreover, there is no problem of deformation of the packaged articles. More preferred range of the heat shrinkage stress is 1.5–2.0 N/mm$^2$. In order for the heat shrinkage stress being in this range, gel fraction of the film is adjusted to the range specified in the present invention and stretching is carried out at a high ratio without orientation at a temperature higher than the melting point of the ethylene polymer resin.

The optical characteristics of the film of the present invention will be explained. Haze of the heat shrinkable film is measured on the film after heat shrunk to 30% in film area at a temperature of 140° C. in accordance with the method of ASTM D-1003. A film of 0–3.0% in haze is preferred because the packaged article can be easily seen through the film. A film having a haze of not more than 2.5% is more preferred because it is superior in transparency and the packaged article is seen beautifully. In order for the haze being in this range, this can be attained by selection of catalyst used for polymerization of the ethylene polymer resin, selection of comonomer, mixing of a plurality of resins (for example, mixing a linear low density polyethylene with a specific low density polyethylene), or adjustment of density or molecular weight distribution of the resin and concentration of the surface active agent.

Further, gloss of the heat shrinkable film of the present invention will be explained. The gloss of the heat shrinkable film of the present invention can be obtained by carrying out the measurement on the film after heat shrunk to 30% in film area at a temperature of 140° C. in accordance with the method of ASTM D-1003. A gloss of the film in the range of 130–180% is preferred. When the gloss is within this range, luster is proper to give good appearance and provide packages liked by consumers. When the gloss of the film is 140–170%, luster increases to give high-quality feeling to the packages, and this is further preferred. In order to produce a film having the gloss in the above range, this can be attained by selection of catalyst used for polymerization of the ethylene polymer resin, selection of comonomer, mixing of a plurality of resins (for example, mixing a linear low density polyethylene with a specific low density polyethylene), or adjustment of density or molecular weight distribution of the resin.

Furthermore, coefficient of dynamic friction of the heat shrinkable film of the present invention will be explained. The coefficient of dynamic friction is a property relating to slipperiness of packaging films. The coefficient of dynamic friction of the heat shrinkable film of the present invention is measured using a measuring rider of 500 g made of metal (satin finished surface) in accordance with ASTM D-1894. In the present invention, the coefficient of dynamic friction is preferably 0.15–0.30. When the film has the coefficient of dynamic friction in this range, the film can be fed to a continuous packaging machine without being caught by the machine to cause breakage, and, besides, there are no troubles during production of the film, namely, the raw film does not slip off at a wind-up machine or the raw film does not come loose of itself. Further, when the coefficient of dynamic friction is 0.15–0.25, the film can be suitably used in high-speed continuous packaging machine, and this range is more preferred. In order for the coefficient of dynamic friction being in the above range, amount of the surface active agent or stirring conditions may be adjusted.

Finally, hot tack sealing strength of the heat shrinkable film of the present invention will be explained. The hot tack sealing strength of the heat shrinkable film of the present invention is measured in accordance with ASTM F-1921-98. Specifically, it is measured using Hot Tack measuring device manufactured by Theller Co., Ltd. at a heat seal die temperature of 150° C. The hot tack sealing strength is preferably 2.0–10.0 N. Within this range, even if heat shrinkage stress is applied at the time of heat shrinking the film, the sealed portion is not peeled due to this stress and occurrence of puncture can be diminished. Furthermore, there is no fear that when the sealed portion becomes hard and the hardened sealed line contacts with other packaged articles, it breaks or scratches the film. When the hot tack sealing strength is 3.0–5.0 N, the temperature in the shrink tunnel can be widely set and passing speed can be made faster, and thus this range is more preferred. In order to obtain a film having a hot tack sealing strength in the above range, this can be attained by selecting the kind of the ethylene polymer resin and comonomer, mixing a plurality of resins (for example, mixing a linear low density polyethylene with a specific low density polyethylene), or adjusting the density or molecular weight distribution of the resin.

Method for the production of the heat shrinkable film of the present invention will be explained.

The heat shrinkable film can be obtained by kneading an ethylene polymer resin and a glycerin fatty acid ester surface active agent using an extruder, molding an unstretched tube, cross-linking the resulting unstretched film, and stretching the unstretched film.

As mentioned above, in the film of the present invention, the glycerin fatty acid ester surface active agent is allowed to bleed out to the surface of the film in a high concentration, and furthermore, the surface active agent is allowed to be present in the form of a band on the surface of the film, whereby the amount of the surface active agent on the surface can be easily controlled and retention of fog resistance is prolonged.

Therefore, in the method for producing the film according to the present invention, it is preferred that firstly the glycerin fatty acid ester surface active agent is added to the ethylene polymer resin by master-batch method, pouring by extruder, or the like.

Furthermore, in the present invention, it is preferred to finely disperse the glycerin fatty acid ester surface active agent (anti-fogging agent) in the ethylene polymer resin. For this purpose, it is necessary to vigorously stir the ethylene polymer resin and the glycerin fatty acid ester surface active agent at high temperatures using an extruder. Specifically, in the method for the production of the film of the present invention, it is preferred to carry out at least a part of the kneading step of the ethylene polymer resin and the glycerin fatty acid ester surface active agent at a temperature of 250° C. or higher and a shear rate of 50 [1/sec] or higher.

That is, the glycerin fatty acid ester surface active agent is apt to undergo heat deterioration at high temperatures, and generally the preset temperature of the extruder is in the range of 200–240° C. However, it is necessary for finely dispersing the surface active agent in the ethylene polymer resin to carry out a part of the kneading step at a high temperature of 250° C. or higher and a high shear rate of 50 [1/sec] or higher with a short retention time, and this is a characteristic means to allow the glycerin fatty acid ester surface active agent to be present in a high concentration on the surface of the film.

As the extruder, either of twin-screw extruder or single screw extruder may be used. In the case of using single screw extruder, the screw is preferably one which can provide high kneadability, such as Dulmage screw, cross Dulmage screw or the like. More preferred is such a screw as of a shear rate of 50 [1/sec] or higher.

For obtaining a shrinkable film having no anisotropy, for example, a biaxially stretched film of tubular type can be used. The method will be explained.

First, a resin containing the surface active agent and others is kneaded and extruded by a ring die using a heating extruder, followed by rapid cooling with water to produce an unstretched tube.

Then, this tube is irradiated with electron rays to carry out cross-linking treatment of resin, subsequently, the tube is heated to higher than the melting point of the resin by heat transfer heating with hot air, radiation heating with an infrared heater, or the like, and then, while the tube is stretched in the flow direction with giving a difference in speed between two pairs of nip rolls, air is injected into the tube thereby stretching the tube in transverse direction, too.

The stretch ratio of the heat shrinkable film of the present invention is generally 5–10 times, preferably 5–8 times in both the machine direction and the transverse direction for giving a high heat shrinkability to the film.

One example of a step for obtaining a shrink package using the heat shrinkable film of the present invention will be explained. The methods for wrapping an article with a heat shrinkable film include packaging methods such as pillow shrink type packaging, L type packaging, and the like. Any of them can be selected, but here the method of continuous packaging by pillow shrink type packaging will be explained.

As articles to be packaged, there are those which are packed in plastic containers, such as notions and miscellaneous goods, lunches and daily dishes, and those which are packed in lidless foamed plastic trays, such as meats, fresh fishes, Japanese-style confections, daily dishes, etc. Especially, when the containers or trays have no top lid, the heat shrinkable film is needed to have fog resistance.

First, an article is covered with a film in the tubular form which has a margin of 10–50% in length in respect to the peripheral length of the article in the direction perpendicular to the flow direction of the article, namely, in the transverse direction, and the edge portions of the film are superposed each other with both the portions being put flat together in such a manner that the sealing line is positioned on the backside of the article. The superposed portion is sealed by a center sealing apparatus of revolving roll type or the like. The sealing method includes impulse sealing, heat sealing, fuse sealing, or the like, and one or more of them can be selected depending on the film used. In the case of using a high-speed continuous packaging apparatus, the heat sealing which can perform the sealing in a short time may be employed.

Subsequently, a margin of 10–50% is prepared for the length of the film in respect to the length of the article in the flow direction of the article, namely, in the machine direction, and both ends of the tubular body are sealed to close the tube and the sealed portion is cut by a cutter blade. If small holes for removing air are previously made in the heat shrinkable film by needles, hot needles or laser, a tightly finished shrink package can be obtained by removing the air in the film tube at the time of heat shrinking of the film.

Then, this package is passed through a hot shrink tunnel previously adjusted to 120° C. to obtain a finished package. If shrinking is carried out with the hot shrink tunnel heated to higher temperatures, there are sometimes caused the troubles such as increase of haze or deterioration of gloss of the heat shrinkable film, or breakage of the packaging film. As a means for heating the inside of the hot shrink tunnel, hot air, vapor or the like can be used, and hot air is preferred.

As mentioned above, since the surface active agent is present in a relatively high concentration on the surface of the heat shrinkable film of the present invention, fog resistance and slipperiness of the film can be improved. Moreover, by allowing the specific surface active agent to be present in the state of a band on the surface of the film, the fog resistance and the slipperiness of the film can further be improved.

EXAMPLES

The present invention will be explained in detail by the following examples and comparative examples.

The evaluation methods employed in the present invention are as follows.

<Gel Fraction of Film>

A sample was subjected to extraction in boiling p-xylene for 12 hours, and the proportion of insoluble matters was expressed by the following formula. This was used as an index of cross-linking degree of the film.

Gel fraction of film (wt %)=(weight of the sample after extraction/weight of the sample before extraction)×100

<Density of Ethylene Polymer Resin>

This was measured in accordance with ASTM D-1505.

<Amount of Glycerin Fatty Acid Ester Surface Active Agent on the Surface of Film>

A sample of 1 m² was cut out from the film. The whole surface of this sample film was wiped with a fabric made of super-fine fibers (e.g., "TORAYSEE" (registered trademark) manufactured by Toray Industries, Ltd.). As the wiping fabric, there was used a fabric previously subjected to Soxhlet extraction (80° C., 2 hours) to remove unnecessary matters contained in the fabric. Operations of wiping were repeated 4–5 times with changing the fabric every time. The surface active agent contained in the fabrics after used for the wiping was extracted with chloroform, and the extraction solution was dried by an evaporator to solidify it. Weight of the residue in the evaporator was determined by gas chromatography and this was taken as the amount of the surface active agent present on the surface of the film.

<Observation of the State of Glycerin Fatty Acid Ester Surface Active Agent Present on the Surface of Film>

Distribution of the surface active agent in the form of a band was observed by a microscopic infrared spectroscopic analytical device (SPECTRA 2000 manufactured by Perkin Elmer Co., Ltd.) and a scanning type probe microscope (NANOSCOPE III A manufactured by Digital Instruments Co., Ltd.). The procedure was specifically as follows.

First, areas of 100 μm×100 μm of the sample were observed by the microscopic infrared spectroscopic analytical device, and mapping of the characteristic peaks of the surface active agent on the surface was conducted. Here, when there were 8 portions or more in the film where the band of the surface active agent was present on nearly the whole surface of the observed image plane, it was judged that the surface active agent was evenly present in the form of nearly a band on the film surface. This method is a simple surface observation method, and thickness of the band was measured by the method explained later. Whether the material present on the surface was surface active agent or not was determined by confirming the presence of hydroxyl groups of the surface active agent using a time-of-flight method type secondary ion-mass spectrography (Tof-SIMS) or a microscopic infrared spectroscopic analysis (ATR).

Subsequently, the state of presence of the surface active agent was more exactly confirmed by the following method.

Whether the surface active agent was distributed in the form of liquid droplets or in the form of a band on the whole surface was reconfirmed by a scanning type probe microscope. That is, a surface observation of the area of 10 μm×10 μm was conducted in the mode of interatomic force microscopic observation. In this observation, images of 100–300 magnifications were observed to confirm whether the distribution of the surface active agent was in the form of a band or in the form of droplets. When droplets were present, there were seen discrete island-like matters present in the form of dots on the image plane, while when the surface active agent was present in the form of a band, there was seen the state where mainly smooth sea continued rather than island-like matters.

Furthermore, thickness of the surface active agent band was measured by obtaining a force curve by scanning a given area with a cantilever of weak spring constant (nominal value: 0.07–0.58 N/m²) in dynamic mode of the scanning type probe microscope. Specifically, a force curve was prepared at randomly 50 or more points in the observation area of 10 μm×10 μm and thickness of the surface active agent band was measured. For this measurement, there may also be used a scanning type probe microscope which can perform mapping.

<Evaluation of Heat Shrinkage>

This was measured in accordance with ASTM D-2732 by carrying out shrinking at a temperature of 120° C. The following evaluation was conducted on shrinkage percentage.

[Criteria of Evaluation]
◎: Not less than 55% and less than 80%. A beautiful shrink package was obtained and this was particularly preferred.
○: Not less than 50% and less than 55%. A shrink package was obtained and this was preferred.
Δ: Not less than 30% and less than 50%. Fine creases occurred, and the film could hardly be used.
x: Less than 30%, and the film could not be used.

<Evaluation of Heat Shrinkage Stress>

A maximum heat shrinkage stress at a temperature of 120° C. was measured in accordance with ASTM D-2838.

[Criteria of Evaluation]
◎: Not less than 1.5 N/mm² and less than 2.0 N/mm². A beautiful shrink package was obtained without causing deformation of the article packaged.
○: Not less than 1.2 N/mm² and less than 1.5 N/mm², or more than 2.0 N/mm² and less than 2.2 N/mm². A shrink package could be obtained without causing deformation of the article packaged.
Δ: Not less than 0.8 N/mm² and less than 1.2 N/mm², or more than 2.2 N/mm² and less than 2.5 N/mm². The film could hardly be used.
x: Less than 0.8 N/mm² or more than 2.5 N/mm². The film was practically not acceptable.

<Evaluation of Haze>

Evaluation was conducted by measuring a haze of the film when it was heat shrunk to 30% in area at a temperature of 140° C., in accordance with a method of ASTM D-1003.

[Criteria of Evaluation]
◎: Not more than 2.5%. The package had no haze and was beautifully finished.
○: More than 2.5% and not more than 3%. The package had some haze, but was beautifully finished.
Δ: More than 3% and not more than 5%. The package had haze and the film could hardly be used.
x: More than 5%. The package appeared whitish and the film could not be practically used.

<Evaluation of Gloss>

Evaluation was conducted by measuring a gloss of the film at an angle of 45° which was heat shrunk to 30% in area at a temperature of 140° C., in accordance with a method of ASTM D-1003.

[Criteria of Evaluation]
◎: Not less than 140% and not more than 180%. The film showed high-grade appearance.
○: Not less than 130% and less than 140%. The film had a proper gloss and gave a beautiful package.
Δ: Not less than 110% and less than 130%. The film was insufficient in gloss and the film could hardly be used.
x: Less than 110%. The film was insufficient in gloss, and could not be practically used.

<Evaluation of Slipperiness>

This was evaluated by coefficient of dynamic friction measured using a rider of 500 g made of metal (satin finished surface) in accordance with ASTM D-1894.

[Criteria of Evaluation]
◎: Not less than 0.15 and not more than 0.25. The film was sufficient for practical use.
○: More than 0.25 and not more than 0.30. The film was practically acceptable.
Δ: Less than 0.15 or more than 0.30 and not more than 0.35. The film could hardly be used.
x: More than 0.35. There was the possibility of the film being frequently broken, and could not be practically used.

<Evaluation of Hot Tack Sealing Strength>

This was measured in accordance with ASTM F-1921-98 using a Hot Tack measuring device manufactured by Theller Co., Ltd. The film was sealed to a test piece of 25 mm in width at a temperature of 150° C. using a V-shaped heat sealing die. Peeling was carried out, and the hot tack sealing strength which changed with time was plotted on the order of 1/1000 seconds, and evaluation was conducted by measuring a sealing strength after 0.25 second from the starting of peeling.

[Criteria of Evaluation]

⊚: Not less than 3.0 and not more than 5.0. This was practically very preferable level.

○: Not less than 2.0 N and less than 3.0 or more than 5.0 N and not more than 10.0 N. This was a practically acceptable level.

Δ: Not less than 1.6 N and less than 2.0 N. Peeling of seal sometimes occurred and use of the film was difficult.

x: Less than 1.6 N. Peeling of seal frequently occurred, and the film was practically not acceptable.

<Evaluation of Fog Resistance>

Evaluation of fog resistance was conducted in the following manner. Water adjusted to 20° C. was charged in a beaker of 500 ml, and the beaker was closed by covering the top with a film. This beaker was stored in a refrigerated counter adjusted to 10° C., and the fog resistance was evaluated by grading the state of water droplets attached to the film and the visibility through the film after lapse of 30 minutes and indicated by 1–5 marks with 5 marks being perfect.

[Criteria of Evaluation]

⊚: 5 marks: There were no spots of water droplets and visibility is satisfactory, and the film was practically acceptable.

○: 4 marks: There were some large water droplets, but visibility was good, and the film was practically acceptable.

Δ: 2–3 marks: There were considerable small water droplets and visibility was inferior, and the film was could hardly be used.

x: 1 mark: The film was fogged with many small water droplets and visibility was seriously bad, and the film was practically not acceptable.

<Overall Evaluation>

⊚: All evaluations were ⊚ and the film could be suitably used as a heat shrinkable film.

○: All evaluations were ○ or ⊚ and the film could be practically used as a heat shrinkable film.

Δ: The evaluations included Δ and the film could hardly be used as a heat shrinkable film.

x: The evaluations included x and the film was practically not acceptable.

Examples 1–24

Films were prepared using the ethylene polymer resins and the glycerin-based surface active agents shown in Table 1 for Examples 1–24. In Table 1, "SSC" means that the polymers were obtained using single-site catalysts and "MSC" means that the polymers were obtained using multi-site catalysts (the same shall apply to Table 2). In the case of producing a film of 3 layer structure comprising two outer layers and an inner layer comprising 2 kinds of the resins, two extruders and ring dies were used, and in the case of producing a film of single layer, one extruder was used. A tube was melt extruded from the ring die, and the tube was rapidly cooled using a water-cooled ring. Unstretched tubes of about 500 μm thick were obtained by the above methods.

The ratio of the layers of the two outer layers and the inner layer in the three layer film was such that the outer layers were 15% and 15%, and 30% in total, and the inner layer was 70%. The surface active agent was added to the ethylene polymer resin by a master batch method. That is, the surface active agent and a part of the ethylene polymer resin were kneaded by a twin-screw extruder to make a master batch, and this was added to the remaining ethylene polymer resin.

As the extruder for the molding of unstretched tube, a single screw extruder was used, and a Dulmage screw was used as the screw. The stirring shear force of the screw was all 100 [1/sec]. Temperature of the extruder was set at 200° C., 230° C., 250° C., 260° C., 260° C. and 260° C. in order from the resin feeding hopper side at six temperature controlling blocks in longer direction. The shear rate was a rate gradient from shear moving rate (moving rate by revolution of screw) at the cylinder wall surface, assuming the rate at the screw wall surface to be 0, and this was obtained by simulating as a drag flow (average value).

The resulting unstretched tube was irradiated with 4 megarads of electron rays accelerated with an accelerating voltage of 500 kV, thereby cross-linking the tube. Subsequently, the unstretched tube was stretched to 7 times in flow direction by the difference in speed between two pairs of nip rolls while being heated to 140° C. by radiation heating with an infrared heater. Then, air was injected into the tube to stretch the tube in the direction perpendicular to the flow direction of the machine. Thereafter, the portion of the maximum diameter of the bubble was exposed to a cold air by an air ring to cool the bubble. The resulting film was then folded to obtain raw films for packaging films of Examples 1–24 which had a thickness of about 10 μm.

The heat shrinkable raw films were stored in a room adjusted to a temperature of 40° C. for 3 days, and then the state of the glycerin fatty acid ester surface active agent present on the surface of the film was observed in the manner mentioned above to confirm whether it was present in the form of a band or not. The unit of "thickness distribution" in Tables 1–2 is "nm".

Then, these heat shrinkable films were evaluated on the above-mentioned heat shrinkage, heat shrinkage stress, haze, gloss, slipperiness, hot tack sealing strength, and fog resistance, and overall evaluation of them was conducted. The results are shown in Table 3.

As a result, it was seen that the resulting heat shrinkable films were very good in both the slipperiness and haze, and when the glycerin fatty acid ester surface active agent was present in an amount of 3.0–20.0 mg/m$^2$ and in the form of a band on the surface, the fog resistance was stable and superior. Furthermore, these films were low in heat shrinkage stress while they were high in shrinking performance, and besides they were markedly excellent in transparency and gloss after shrinking.

Moreover, it was seen from the results of Examples 11, 17 and 18 that the heat shrinkage stress varied depending on the irradiation dose (gel fraction of the film), and there was a tendency of increase of heat shrinkage stress with increase of the gel fraction of the film.

It was also seen from the results of Examples 2, 10, 11 and 15 that the slipperiness, optical characteristics and sealability varied depending on the kind of the ethylene copolymer resin used.

Further, the films of Examples 1–12, 14, 16–18 and 21–24 were very good in extrusion stability and stretching stability, and unevenness in thickness of the films was very small.

Comparative Examples 1–8

Films were obtained in the same manner as in Example 1, except that composition of the resin in each layer was changed as shown in Table 2, and after the addition of the surface active agent, kneading was carried out at 230° C. by a single flight screw (shear rate: 40 [1/sec]). In Comparative Examples 7–8, the surface active agent was further coated on the surface so that the amount of the surface active agent on the surface (amount of the surface active agent which bled to the surface + amount of the coated surface active agent) was 3.0 mg/m². These were Comparative Examples 1–8, and the results are shown in Table 4.

According to Table 4, as can be seen from the results of Comparative Example 1, when the film was stretched at a high temperature with an irradiation dose of less than 2 megarads (1 megarad, gel fraction 4%), the heat shrinkable film was low in heat shrinkage stress.

Conversely, as can be seen from the results of Comparative Example 2, when the irradiation dose was higher than 10 megarads (12 megarads, gel fraction 45%), there was obtained a packaging film which was too high in heat shrinkage stress.

On the other hand, as can be seen from the results of Comparative Examples 3–6, even if the glycerin fatty acid ester surface active agent was distributed in the form of a band, a sufficient fog resistance could not be obtained if the amount thereof on the surface was less than 3.0 mg/m². Furthermore, even if the amount thereof on the surface was not less than 3.0 mg/m², no satisfactory fog resistance could be obtained if the surface active agent was present in the form of dots.

TABLE 1

| Ex. | | Composition of ethylene polymer resin | | | | Surface active agent |
|---|---|---|---|---|---|---|
| 1 | Outer layer: | Ethylene-α-olefin (hexene-1) | SSC | ρ=0.914 | MI=2.0 | 70 wt % Diglycerin oleate |
|   | Inner layer: | Ethylene-α-olefin (octene-1) | MSC | ρ=0.926 | MI=2.0 | 30 wt % |
|   |   | Low density polyethylene | | ρ=0.920 | MI=0.4 | |
|   | Outer layer: | Ethylene-α-olefin (hexene-1) | SSC | ρ=0.914 | MI=2.0 | 70 wt % Mixture of diglycerin |
| 2 | Outer layer: | Ethylene-α-olefin (hexene-1) | SSC | ρ=0.914 | MI=2.0 | 30 wt % oleate and glycerin |
|   | Inner layer: | Ethylene-α-olefin (octene-1) | MSC | ρ=0.926 | MI=2.0 | monooleate (1:1) |
|   |   | Low density polyethylene | | ρ=0.920 | MI=0.4 | |
|   | Outer layer: | Ethylene-α-olefin (hexene-1) | SSC | ρ=0.914 | MI=2.0 | |
| 3 | Outer layer: | Ethylene-α-olefin (hexene-1) | SSC | ρ=0.914 | MI=2.0 | 70 wt % Mixture of diglycerin |
|   | Inner layer: | Ethylene-α-olefin (octene-1) | MSC | ρ=0.926 | MI=2.0 | 30 wt % oleate and glycerin |
|   |   | Low density polyethylene | | ρ=0.920 | MI=0.4 | monooleate (1:1) |
|   | Outer layer: | Ethylene-α-olefin (hexene-1) | SSC | ρ=0.914 | MI=2.0 | |
| 4 | Outer layer: | Ethylene-α-olefin (hexene-1) | SSC | ρ=0.914 | MI=2.0 | 70 wt % Mixture of diglycerin |
|   | Inner layer: | Ethylene-α-olefin (octene-1) | MSC | ρ=0.926 | MI=2.0 | 30 wt % oleate and glycerin |
|   |   | Low density polyethylene | | ρ=0.920 | MI=0.4 | monooleate (1:1) |
|   | Outer layer: | Ethylene-α-olefin (hexene-1) | SSC | ρ=0.914 | MI=2.0 | |
| 5 | Outer layer: | Ethylene-α-olefin (hexene-1) | SSC | ρ=0.914 | MI=2.0 | 70 wt % Mixture of diglycerin |
|   | Inner layer: | Ethylene-α-olefin (octene-1) | MSC | ρ=0.926 | MI=2.0 | 30 wt % oleate and glycerin |
|   |   | Low density polyethylene | | ρ=0.920 | MI=0.4 | monooleate (1:1) |
|   | Outer layer: | Ethylene-α-olefin (hexene-1) | SSC | ρ=0.914 | MI=2.0 | |
| 6 | Outer layer: | Ethylene-α-olefin (hexene-1) | SSC | ρ=0.914 | MI=2.0 | 70 wt % Mixture of diglycerin |
|   | Inner layer: | Ethylene-α-olefin (octene-1) | MSC | ρ=0.926 | MI=2.0 | 30 wt % oleate and glycerin |
|   |   | Low density polyethylene | | ρ=0.920 | MI=0.4 | monooleate (1:1) |
|   | Outer layer: | Ethylene-α-olefin (hexene-1) | SSC | ρ=0.914 | MI=2.0 | |
| 7 | Outer layer: | Ethylene-α-olefin (hexene-1) | SSC | ρ=0.914 | MI=2.0 | 70 wt % Diglycerin laurate |
|   | Inner layer: | Ethylene-α-olefin (octene-1) | MSC | ρ=0.926 | MI=2.0 | 30 wt % |
|   |   | Low density polyethylene | | ρ=0.920 | MI=0.4 | |
|   | Outer layer: | Ethylene-α-olefin (hexene-1) | SSC | ρ=0.914 | MI=2.0 | |
| 8 | Outer layer: | Ethylene-α-olefin (hexene-1) | SSC | ρ=0.914 | MI=2.0 | 70 wt % Glycerin monooleate |
|   | Inner layer: | Ethylene-α-olefin (octene-1) | MSC | ρ=0.926 | MI=2.0 | 30 wt % |
|   |   | Low density polyethylene | | ρ=0.920 | MI=0.4 | |
|   | Outer layer: | Ethylene-α-olefin (hexene-1) | SSC | ρ=0.914 | MI=2.0 | |

| Amount of surface active agent added | Amount on the surface | Surface distribution (thickness distribution) | Irradiation (gel fraction) |
|---|---|---|---|
| 2.5 wt % | 3.0 mg/m² | band (5–20) | 4 (20%) |
| 2.5 wt % | 3.0 mg/m² | band (5–20) | 4 (20%) |
| 2.5 wt % | 4.0 mg/m² | band (5–30) | 4 (20%) |
| 2.5 wt % | 5.0 mg/m² | band (5–40) | 4 (20%) |
| 2.0 wt % | 3.0 mg/m² | band (5–40) | 4 (20%) |
| 3.0 wt % | 5.0 mg/m² | band (5–40) | 4 (20%) |
| 3.0 wt % | 5.0 mg/m² | band (5–40) | 4 (20%) |
| 3.0 wt % | 5.0 mg/m² | band (5–20) | 4 (20%) |

TABLE 1-continued

| Ex. | | Composition of ethylene polymer resin | | | | Surface active agent | |
|---|---|---|---|---|---|---|---|
| 9 | Outer layer: | Ethylene-α-olefin (octene-1) | MSC | ρ=0.914 | MI=1.0 | 70 wt % | Diglycerin oleate |
| | Inner layer: | Ethylene-α-olefin (octene-1) | MSC | ρ=0.926 | MI=2.0 | 30 wt % | |
| | | Low density polyethylene | | ρ=0.920 | MI=0.4 | | |
| | Outer layer: | Ethylene-α-olefin (octene-1) | MSC | ρ=0.914 | MI=1.0 | | |
| 10 | Outer layer: | Ethylene-α-olefin (octene-1) | MSC | ρ=0.914 | MI=1.0 | 70 wt % | Mixture of diglycerin |
| | Inner layer: | Ethylene-α-olefin (octene-1) | MSC | ρ=0.926 | MI=2.0 | 30 wt % | oleate and glycerin |
| | | Low density polyethylene | | ρ=0.920 | MI=0.4 | | monooleate (1:1) |
| | Outer layer: | Ethylene-α-olefin (octene-1) | MSC | ρ=0.914 | MI=1.0 | | |
| 11 | Outer layer: | Ethylene-α-olefin (hexene-1) | SSC | ρ=0.914 | MI=2.0 | 90 wt % | Mixture of diglycerin |
| | | Low density polyethylene | | ρ=0.922 | MI=0.5 | 10 wt % | oleate and glycerin |
| | Inner layer: | Ethylene-α-olefin (octene-1) | MSC | ρ=0.926 | MI=2.0 | 70 wt % | monooleate (1:1) |
| | | Low density polyethylene | | ρ=0.920 | MI=0.4 | 30 wt % | |
| | Outer layer: | Ethylene-α-olefin (hexene-1) | SSC | ρ=0.914 | MI=2.0 | 90 wt % | |
| | | Low density polyethylene | | ρ=0.922 | MI=0.5 | 10 wt % | |
| 12 | Outer layer: | Ethylene-α-olefin (hexene-1) | SSC | ρ=0.914 | MI=2.0 | 90 wt % | Mixture of diglycerin |
| | | Low density polyethylene | | ρ=0.922 | MI=0.5 | 10 wt % | oleate and glycerin |
| | Inner layer: | Ethylene-α-olefin (octene-1) | MSC | ρ=0.926 | MI=2.0 | 70 wt % | monooleate (1:1) |
| | | Low density polyethylene | | ρ=0.920 | MI=0.4 | 30 wt % | |
| | Outer layer: | Ethylene-α-olefin (hexene-1) | SSC | ρ=0.914 | MI=2.0 | 90 wt % | |
| | | Low density polyethylene | | ρ=0.922 | MI=0.5 | 10 wt % | |
| 13 | Outer layer: | Ethylene-α-olefin (hexene-1) | SSC | ρ=0.914 | MI=2.0 | 90 wt % | Mixture of diglycerin |
| | | Low density polyethylene | | ρ=0.922 | MI=0.5 | 10 wt % | oleate and glycerin |
| | Inner layer: | Ethylene-α-olefin (hexene-1) | SSC | ρ=0.919 | MI=2.0 | | monooleate (1:1) |
| | Outer layer: | Ethylene-α-olefin (hexene-1) | SSC | ρ=0.914 | MI=2.0 | 90 wt % | |
| | | Low density polyethylene | | ρ=0.922 | MI=0.5 | 10 wt % | |
| 14 | Outer layer: | Ethylene-α-olefin (hexene-1) | SSC | ρ=0.914 | MI=2.0 | 90 wt % | Mixture of diglycerin |
| | | Low density polyethylene | | ρ=0.922 | MI=0.5 | 10 wt % | oleate and glycerin |
| | Inner layer: | Ethylene-α-olefin (hexene-1) | SSC | ρ=0.925 | MI=2.0 | | monooleate (1:1) |
| | Outer layer: | Ethylene-α-olefin (hexene-1) | SSC | ρ=0.914 | MI=2.0 | 90 wt % | |
| | | Low density polyethylene | | ρ=0.922 | MI=0.5 | 10 wt % | |
| 15 | Single layer: | Ethylene-α-olefin (hexene-1) | SSC | ρ=0.914 | MI=2.0 | 90 wt % | Mixture of diglycerin |
| | | Low density polyethylene | | ρ=0.922 | MI=0.5 | 10 wt % | oleate and glycerin |

| Amount of surface active agent added | Amount on the surface | Surface distribution (thickness distribution) | Irradiation (gel fraction) |
|---|---|---|---|
| 2.5 wt % | 3.0 mg/m$^2$ | band (5–20) | 4 (20%) |
| 2.5 wt % | 3.0 mg/m$^2$ | band (5–20) | 4 (20%) |
| 2.5 wt % | 4.0 mg/m$^2$ | band (5–35) | 4 (20%) |
| 3.0 wt % | 5.0 mg/m$^2$ | band (5–40) | 4 (20%) |
| 3.0 wt % | 4.0 mg/m$^2$ | band (5–30) | 4 (20%) |
| 3.0 wt % | 4.0 mg/m$^2$ | band (5–30) | 4 (20%) |
| 2.5 wt % | 3.0 mg/m$^2$ | band (5–20) | 4 (20%) |

| Ex. | | Composition of ethylene polymer resin | | | | Surface active agent | |
|---|---|---|---|---|---|---|---|
| 16 | Outer layer: | Ethylene-α-olefin (hexene-1) | SSC | ρ=0.914 | MI=2.0 | 70 wt % | Mixture of diglycerin |
| | Inner layer: | Ethylene-α-olefin (octene-1) | MSC | ρ=0.926 | MI=2.0 | 30 wt % | oleate and glycerin |
| | | Low density polyethylene | | ρ=0.920 | MI=0.4 | | monooleate (1:1) |
| | Outer layer: | Ethylene-α-olefin (hexene-1) | SSC | ρ=0.914 | MI=1.0 | | |
| 17 | Outer layer: | Ethylene-α-olefin (hexene-1) | SSC | ρ=0.914 | MI=2.0 | 90 wt % | Mixture of diglycerin |
| | | Low density polyethylene | | ρ=0.922 | MI=0.5 | 10 wt % | oleate and glycerin |
| | Inner layer: | Ethylene-α-olefin (octene-1) | MSC | ρ=0.926 | MI=2.0 | 70 wt % | monooleate (1:1) |
| | | Low density polyethylene | | ρ=0.920 | MI=0.4 | 30 wt % | |
| | Outer layer: | Ethylene-α-olefin (hexene-1) | SSC | ρ=0.914 | MI=2.0 | 90 wt % | |
| | | Low density polyethylene | | ρ=0.922 | MI=0.5 | 10 wt % | |
| 18 | Outer layer: | Ethylene-α-olefin (hexene-1) | SSC | ρ=0.914 | MI=2.0 | 90 wt % | Mixture of diglycerin |
| | | Low density polyethylene | | ρ=0.922 | MI=0.5 | 10 wt % | oleate and glycerin |
| | Inner layer: | Ethylene-α-olefin (octene-1) | MSC | ρ=0.926 | MI=2.0 | 70 wt % | monooleate (1:1) |
| | | Low density polyethylene | | ρ=0.920 | MI=0.4 | 30 wt % | |
| | Outer layer: | Ethylene-α-olefin (hexene-1) | SSC | ρ=0.914 | MI=2.0 | 90 wt % | |
| | | Low density polyethylene | | ρ=0.922 | MI=0.5 | 10 wt % | |
| 19 | Outer layer: | Ethylene-α-olefin (hexene-1) | SSC | ρ=0.914 | MI=2.0 | 90 wt % | Mixture of diglycerin |
| | | Low density polyethylene | | ρ=0.922 | MI=0.5 | 10 wt % | oleate and glycerin |
| | Inner layer: | Ethylene-α-olefin (octene-1) | MSC | ρ=0.926 | MI=2.0 | 70 wt % | monooleate (1:1) |
| | | Low density polyethylene | | ρ=0.920 | MI=0.4 | 30 wt % | |
| | Outer layer: | Ethylene-α-olefin (hexene-1) | SSC | ρ=0.914 | MI=2.0 | 90 wt % | |
| | | Low density polyethylene | | ρ=0.922 | MI=0.5 | 10 wt % | |

TABLE 1-continued

| | | | | | | |
|---|---|---|---|---|---|---|
| 20 | Outer layer: | Ethylene-α-olefin (hexene-1) | SSC | ρ=0.914 MI=2.0 | 90 wt % | Mixture of diglycerin |
| | | Low density polyethylene | | ρ=0.922 MI=0.5 | 10 wt % | oleate and glycerin |
| | Inner layer: | Ethylene-α-olefin (octene-1) | MSC | ρ=0.926 MI=2.0 | 70 wt % | monooleate (1:1) |
| | | Low density polyethylene | | ρ=0.920 MI=0.4 | 30 wt % | |
| | Outer layer: | Ethylene-α-olefin (hexene-1) | SSC | ρ=0.914 MI=2.0 | 90 wt % | |
| | | Low density polyethylene | | ρ=0.922 MI=0.5 | 10 wt % | |

| Amount of surface active agent added | Amount on the surface | Surface distribution (thickness distribution) | Irradiation (gel fraction) |
|---|---|---|---|
| 2.5 wt % | 4.0 mg/m$^2$ | band (5–30) | 2 (10%) |
| 2.5 wt % | 4.0 mg/m$^2$ | band (5–30) | 2 (10%) |
| 2.5 wt % | 4.0 mg/m$^2$ | band (5–30) | 8 (30%) |
| 5.0 wt % | 14.0 mg/m$^2$ | band (5–45) | 4 (20%) |
| 8.0 wt % | 20.0 mg/m$^2$ | band (5–50) | 4 (20%) |

| Ex. | | Composition of ethylene polymer resin | | | | Surface active agent |
|---|---|---|---|---|---|---|
| 21 | Outer layer: | Ethylene-α-olefin (hexene-1) | SSC | ρ=0.914 MI=2.0 | 90 wt % | Mixture of diglycerin |
| | | Low density polyethylene | | ρ=0.922 MI=0.5 | 10 wt % | oleate and glycerin |
| | Inner layer: | Ethylene-α-olefin (hexene-1) | SSC | ρ=0.925 MI=2.0 | 70 wt % | monooleate (1:1) |
| | | Low density polyethylene | | ρ=0.920 MI=0.2 | 30 wt % | |
| | Outer layer: | Ethylene-α-olefin (hexene-1) | SSC | ρ=0.914 MI=2.0 | 90 wt % | |
| | | Low density polyethylene | | ρ=0.922 MI=0.5 | 10 wt % | |
| 22 | Outer layer: | Ethylene-α-olefin (hexene-1) | SSC | ρ=0.914 MI=2.0 | 90 wt % | Mixture of diglycerin |
| | | Low density polyethylene | | ρ=0.922 MI=0.5 | 10 wt % | oleate and glycerin |
| | Inner layer: | Ethylene-α-olefin (hexene-1) | SSC | ρ=0.926 MI=2.0 | 60 wt % | monooleate (1:1) |
| | | Low density polyethylene | | ρ=0.920 MI=0.2 | 40 wt % | |
| | Outer layer: | Ethylene-α-olefin (hexene-1) | SSC | ρ=0.914 MI=2.0 | 90 wt % | |
| | | Low density polyethylene | | ρ=0.922 MI=0.5 | 10 wt % | |
| 23 | Outer layer: | Ethylene-α-olefin (hexene-1) | SSC | ρ=0.914 MI=2.0 | 90 wt % | Mixture of diglycerin |
| | | Low density polyethylene | | ρ=0.922 MI=0.5 | 10 wt % | oleate and glycerin |
| | Inner layer: | Ethylene-α-olefin (octene-1) | MSC | ρ=0.913 MI=3.0 | 65 wt % | monooleate (1:1) |
| | | Low density polyethylene | | ρ=0.922 MI=0.4 | 35 wt % | |
| | Outer layer: | Ethylene-α-olefin (hexene-1) | SSC | ρ=0.914 MI=2.0 | 90 wt % | |
| | | Low density polyethylene | | ρ=0.922 MI=0.5 | 10 wt % | |
| 24 | Outer layer: | Ethylene-α-olefin (hexene-1) | SSC | ρ=0.914 MI=2.0 | 65 wt % | Mixture of diglycerin |
| | Inner layer: | Ethylene-α-olefin (hexene-1) | SSC | ρ=0.925 MI=2.0 | 35 wt % | oleate and glycerin monooleate (1:1) |
| | | Low density polyethylene | | ρ=0.920 MI=0.2 | | |
| | Outer layer: | Ethylene-α-olefin (hexene-1) | SSC | ρ=0.914 MI=2.0 | | |

| Amount of surface active agent added | Amount on the surface | Surface distribution (thickness distribution) | Irradiation (gel fraction) |
|---|---|---|---|
| 3.0 wt % | 4.0 mg/m$^2$ | band (5–30) | 4 (20%) |
| 3.0 wt % | 4.0 mg/m$^2$ | band (5–30) | 4 (20%) |
| 3.0 wt % | 4.0 mg/m$^2$ | band (5–30) | 4 (20%) |
| 3.0 wt % | 4.0 mg/m$^2$ | band (5–30) | 4 (20%) |

TABLE 2

| Comp. Ex. | | Composition of ethylene polymer resin | | | | Surface active agent |
|---|---|---|---|---|---|---|
| 1 | Outer layer: | Ethylene-α-olefin (hexene-1) | SSC | ρ=0.890 MI=2.0 | 70 wt % | Mixture of diglycerin |
| | Inner layer: | Ethylene-α-olefin (octene-1) | MSC | ρ=0.926 MI=2.0 | 30 wt % | oleate and glycerin |
| | | Low density polyethylene | | ρ=0.920 MI=0.4 | | monooleate (1:1) |
| | Outer layer: | Ethylene-α-olefin (hexene-1) | SSC | ρ=0.890 MI=2.0 | 70 wt % | Mixture of diglycerin |
| 2 | Outer layer: | Ethylene-α-olefin (hexene-1) | SSC | ρ=0.937 MI=2.0 | 30 wt % | oleate and glycerin |
| | Inner layer: | Ethylene-α-olefin (octene-1) | MSC | ρ=0.926 MI=2.0 | | monooleate (1:1) |
| | | Low density polyethylene | | ρ=0.920 MI=0.4 | | |
| | Outer layer: | Ethylene-α-olefin (hexene-1) | SSC | ρ=0.937 MI=2.0 | | |
| 3 | Outer layer: | Ethylene-α-olefin (hexene-1) | SSC | ρ=0.914 MI=2.0 | 70 wt % | Mixture of diglycerin |
| | Inner layer: | Ethylene-α-olefin (octene-1) | MSC | ρ=0.926 MI=2.0 | 30 wt % | oleate and glycerin |
| | | Low density polyethylene | | ρ=0.920 MI=0.4 | | monooleate (1:1) |
| | Outer layer: | Ethylene-α-olefin (hexene-1) | SSC | ρ=0.914 MI=2.0 | | |

TABLE 2-continued

| | | | | | | |
|---|---|---|---|---|---|---|
| 4 | Outer layer: | Ethylene-α-olefin (hexene-1) | SSC | ρ=0.914 | MI=2.0 | 70 wt % Mixture of diglycerin |
| | Inner layer: | Ethylene-α-olefin (octene-1) | MSC | ρ=0.926 | MI=2.0 | 30 wt % oleate and glycerin |
| | | Low density polyethylene | | ρ=0.920 | MI=0.4 | monooleate (1:1) |
| | Outer layer: | Ethylene-α-olefin (hexene-1) | SSC | ρ=0.914 | MI=2.0 | |
| 5 | Outer layer: | Ethylene-α-olefin (hexene-1) | SSC | ρ=0.914 | MI=2.0 | 70 wt % Mixture of diglycerin |
| | Inner layer: | Ethylene-α-olefin (octene-1) | MSC | ρ=0.926 | MI=2.0 | 30 wt % oleate and glycerin |
| | | Low density polyethylene | | ρ=0.920 | MI=0.4 | monooleate (1:1) |
| | Outer layer: | Ethylene-α-olefin (hexene-1) | SSC | ρ=0.914 | MI=2.0 | |
| 6 | Outer layer: | Ethylene-α-olefin (hexene-1) | SSC | ρ=0.914 | MI=2.0 | 70 wt % Mixture of diglycerin |
| | Inner layer: | Ethylene-α-olefin (octene-1) | MSC | ρ=0.926 | MI=2.0 | 30 wt % oleate and glycerin |
| | | Low density polyethylene | | ρ=0.920 | MI=0.4 | monooleate (1:1) |
| | Outer layer: | Ethylene-α-olefin (hexene-1) | SSC | ρ=0.914 | MI=2.0 | |
| 7 | Outer layer: | Ethylene-α-olefin (hexene-1) | SSC | ρ=0.914 | MI=2.0 | 70 wt % Mixture of diglycerin |
| | Inner layer: | Ethylene-α-olefin (octene-1) | MSC | ρ=0.926 | MI=2.0 | 30 wt % oleate and glycerin |
| | | Low density polyethylene | | ρ=0.920 | MI=0.4 | monooleate (1:1) |
| | Outer layer: | Ethylene-α-olefin (hexene-1) | SSC | ρ=0.914 | MI=2.0 | |
| 8 | Outer layer: | Ethylene-α-olefin (hexene-1) | SSC | ρ=0.914 | MI=2.0 | 70 wt % Mixture of diglycerin |
| | Inner layer: | Ethylene-α-olefin (octene-1) | MSC | ρ=0.926 | MI=2.0 | 30 wt % oleate and glycerin |
| | | Low density polyethylene | | ρ=0.920 | MI=0.4 | monooleate (1:1) |
| | Outer layer: | Ethylene-α-olefin (hexene-1) | SSC | ρ=0.914 | MI=2.0 | |

| Amount of surface active agent added | Amount on the surface | Surface distribution (thickness distribution) | Irradiation (gel fraction) |
|---|---|---|---|
| 2.5 wt % | 3.0 mg/m$^2$ | band (5–10) | 4 (20%) |
| 2.5 wt % | 3.0 mg/m$^2$ | band (5–10) | 4 (20%) |
| 2.5 wt % | 3.0 mg/m$^2$ | band (5–10) | 1 (4%) |
| 2.5 wt % | 3.0 mg/m$^2$ | band (5–20) | 12 (45%) |
| 1.5 wt % | 1.5 mg/m$^2$ | band (5–10) | 4 (20%) |
| 2.0 wt % | 1.5 mg/m$^2$ | band (5–10) | 4 (20%) |
| 0.5 wt % (Coating) | 3.0 mg/m$^2$ | band (0–300) | 4 (20%) |
| 1.5 wt % (Coating) | 3.0 mg/m$^2$ | band (0–550) | 4 (20%) |

TABLE 3

| Evaluation items | Example 1 | Example 2 | Example 3 | Example 4 | Example 5 | Example 6 | Example 7 | Example 8 | Example 9 | Example 10 |
|---|---|---|---|---|---|---|---|---|---|---|
| Heat shrinkage (%) MD/TD | 57/56 ⊚ | 57/56 ⊚ | 57/56 ⊚ | 57/56 ⊚ | 57/56 ⊚ | 57/56 ⊚ | 57/56 ⊚ | 57/56 ⊚ | 57/56 ⊚ | 57/56 ⊚ |
| Heat shrinkage stress (N/mm$^2$) MD/TD | 1.8/1.7 ⊚ | 1.8/1.7 ⊚ | 1.8/1.7 ⊚ | 1.8/1.7 ⊚ | 1.8/1.7 ⊚ | 1.8/1.7 ⊚ | 1.8/1.7 ⊚ | 1.8/1.7 ⊚ | 1.8/1.8 ⊚ | 1.8/1.8 ⊚ |
| Haze after shrinking (%) | 2.3 ⊚ | 2.4 ⊚ | 2.3 ⊚ | 2.3 ⊚ | 2.4 ⊚ | 2.3 ⊚ | 3.0 ○ | 3.0 ○ | 2.2 ⊚ | 2.2 ⊚ |
| Gloss after shrinking (%) | 145 ⊚ | 145 ⊚ | 145 ⊚ | 146 ⊚ | 145 ⊚ | 146 ⊚ | 139 ○ | 139 ○ | 150 ⊚ | 150 ⊚ |
| Shipperness (coefficient of dynamic friction) | 0.22 ⊚ | 0.21 ⊚ | 0.22 ⊚ | 0.22 ⊚ | 0.22 ⊚ | 0.22 ⊚ | 0.22 ⊚ | 0.21 ⊚ | 0.30 ○ | 0.30 ○ |
| Hot tack sealing strength (N) | 4.0 ⊚ | 4.0 ⊚ | 4.0 ⊚ | 4.0 ⊚ | 4.0 ⊚ | 4.0 ⊚ | 4.0 ⊚ | 4.0 ⊚ | 3.0 ⊚ | 3.0 ⊚ |
| Fog resistance | 5 ⊚ | 5 ⊚ | 5 ⊚ | 5 ⊚ | 5 ⊚ | 5 ⊚ | 5 ⊚ | 4 ○ | 5 ⊚ | 5 ⊚ |
| Overall Evaluation | ⊚ | ⊚ | ⊚ | ⊚ | ⊚ | ⊚ | ○ | ○ | ○ | ○ |

| Evaluation items | Example 11 | Example 12 | Example 13 | Example 14 | Example 15 | Example 16 | Example 17 | Example 18 | Example 19 | Example 20 |
|---|---|---|---|---|---|---|---|---|---|---|
| Heat shrinkage (%) MD/TD | 57/56 ⊚ | 57/56 ⊚ | 57/56 ⊚ | 57/56 ⊚ | 57/57 ⊚ | 53/52 ○ | 53/52 ○ | 59/58 ⊚ | 57/56 ⊚ | 57/56 ⊚ |
| Heat shrinkage stress (N/mm$^2$) MD/TD | 1.8/1.8 ⊚ | 1.8/1.7 ⊚ | 1.8/1.7 ⊚ | 1.8/1.7 ⊚ | 1.8/1.8 ⊚ | 1.5/1.4 ○ | 1.5/1.4 ○ | 2.2/2.1 ○ | 1.8/1.8 ⊚ | 1.8/1.8 ⊚ |

TABLE 3-continued

| | | | | | | | | | | |
|---|---|---|---|---|---|---|---|---|---|---|
| Haze after shrinking (%) | 2.3 ◉ | 2.2 ◉ | 2.2 ◉ | 2.2 ◉ | 2.3 ◉ | 2.3 ◉ | 2.3 ◉ | 2.3 ◉ | 1.8 ◉ | 2.3 ◉ |
| Gloss after shrinking (%) | 145 ◉ | 150 ◉ | 150 ◉ | 150 ◉ | 145 ◉ | 145 ◉ | 145 ◉ | 145 ◉ | 152 ◉ | 145 ◉ |
| Shipperness (coefficient of dynamic friction) | 0.23◉ | 0.22◉ | 0.22◉ | 0.22◉ | 0.22◉ | 0.22◉ | 0.22◉ | 0.22 ◉ | 0.25◉ | 0.29○ |
| Hot tack sealing strength (N) | 4.0 ◉ | 4.0 ◉ | 4.0 ◉ | 4.0 ◉ | 4.0 ◉ | 4.0 ◉ | 4.0 ◉ | 2.0 ○ | 4.0 ◉ | 4.0 ◉ |
| Fog resistance | 5 ◉ | 5 ◉ | 5 ◉ | 5 ◉ | 4 ○ | 5 ◉ | 5 ◉ | 5 ◉ | 5 ◉ | 5 ◉ |
| Overall Evaluation | ◉ | ◉ | ◉ | ◉ | ○ | ○ | ○ | ○ | ◉ | ○ |

| Evaluation items | Example 21 | Example 22 | Example 23 | Example 24 |
|---|---|---|---|---|
| Heat shrinkage (%) MD/TD | 57/56 ◉ | 56/56 ◉ | 56/56 ◉ | 57/56 ◉ |
| Heat shrinkage stress (N/mm²) MD/TD | 1.8/1.8 ◉ | 1.7/1.7 ◉ | 1.8/1.8 ◉ | 1.8/1.7 ◉ |
| Haze after shrinking (%) | 2.1 ◉ | 2.3 ◉ | 2.0 ◉ | 2.2 ◉ |
| Gloss after shrinking (%) | 149 ◉ | 148 ◉ | 150 ◉ | 145 ◉ |
| Shipperness (coefficient of dynamic friction) | 0.22◉ | 0.22◉ | 0.22◉ | 0.23◉ |
| Hot tack sealing strength (N) | 4.0 ◉ | 4.0 ◉ | 4.0 ◉ | 4.0 ◉ |
| Fog resistance | 5 ◉ | 5 ◉ | 5 ◉ | 5 ◉ |
| Overall Evaluation | ◉ | ◉ | ◉ | ◉ |

TABLE 4

| Evaluation items | Comparative Example 1 | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Heat shrinkage (%) MD/TD | 53/50 ○ | 59/58 ◉ | 50/50 ○ | 59/58 ◉ | 57/56 ◉ | 57/56 ◉ | 57/56 ◉ | 57/56 ◉ |
| Heat shrinkage stress (N/mm²) MD/TD | 1.4/1.4 ○ | 2.2/2.1 ○ | 1.2/1.1 △ | 2.4/2.3 △ | 1.8/1.7 ◉ | 1.8/1.7 ◉ | 1.8/1.7 ◉ | 1.8/1.7 ◉ |
| Haze after shrinking (%) | 2.5 ◉ | 4.5 △ | 2.6 ○ | 2.6 ○ | 2.5 ◉ | 2.5 ◉ | 2.5 ◉ | 2.5 ◉ |
| Gloss after shrinking (%) | 140 ◉ | 120 △ | 138 ○ | 140 ◉ | 145 ◉ | 145 ◉ | 145 ◉ | 145 ◉ |
| Shipperness (coefficient of dynamic friction) | 0.36 x | 0.22◉ | 0.22 ◉ | 0.22 ◉ | 0.21◉ | 0.21◉ | 0.21◉ | 0.21◉ |
| Hot tack sealing strength (N) | 1.0 x | 1.0 x | 4.5 ◉ | 1.8 △ | 4.0 ◉ | 4.0 ◉ | 4.0 ◉ | 4.0 ◉ |
| Fog resistance | 5 ◉ | 5 ◉ | 5 ◉ | 5 ◉ | 2 △ | 2 △ | 2 △ | 2 △ |
| Overall Evaluation | x | x | △ | △ | △ | △ | △ | △ |

INDUSTRIAL APPLICABILITY

The heat shrinkable films of the present invention are not high in shrinkage stress while being high in shrink performance, and are excellent in transparency and gloss even after being shrunk, and hence, they can be preferably used for shrink package. Moreover, they can be suitably used for uses requiring fog resistance.

Furthermore, since the heat shrinkable films of the present invention are good in slipperiness and high in hot tack sealing strength, they can also be used as packaging films applicable to high-speed continuous packaging machines.

What is claimed is:

1. A cross-linked heat shrinkable laminate film where the laminate film comprises at least 3 layers composed of outer layers and an inner layer, two outer layers and an inner layer comprise an ethylene polymer resin having a density of 0.900-0.934 g/cm$^3$, and said ethylene polymer resin is at least one member selected from the group consisting of (i) intermediate density polyethylene; (ii) low density polyethylene; (iii) ethylene-α-olefin copolymer comprising linear low density polyethylene and/or ultra-low density polyethylene; and (iv) mixtures thereof, and the outer layers comprise one member selected from the group consisting of an ethylene-α-olefin copolymer, a low density polyethylene and mixtures thereof, the laminate film has a gel fraction of 5–40% and contains a glycerin fatty acid ester surface active agent in an amount of 2.0–8.0% by weight based on the total weight of the ethylene polymer resin, and said surface active agent is present in an amount of 3.0–20.0 mg/m$^2$ on at least one surface of the film, and the heat shrinkage of the film at 120° C. is 50–80% in both the machine direction and the transverse direction and the transverse direction, and the heat shrinkage stress of the film at 120° C. is 1.2–2.2 N/mm$^2$ in both the machine direction and the transverse direction.

2. A heat shrinkable film according to claim 1, wherein the haze of the film which is heat shrunk to 30% in film area at 140° C. is 0–3.0% and the gloss of the film which is heat shrunk to 30% in film area at 140° C. is 130–180%.

3. A heat shrinkable film according to claim 1, wherein the coefficient of dynamic friction of the film is 0.15–0.30 and the hot tack sealing strength of the film when temperature of heat sealing die is 150° C. is 2.0–10.0 N.

4. A heat shrinkable film according to claim 1 which has a thickness of 5–30 μm.

5. A heat shrinkable film according to claim 1 which is a laminate film comprising three layers of outer layers and an inner layer, the outer layers and/or the inner layer being layers containing an ethylene-α-olefin copolymer obtained using a single-site catalyst.

6. A method for producing a heat shrinkable film including the steps of kneading an ethylene polymer resin having a density of 0.900-0.934 g/cm$^3$ and a glycerin fatty acid ester surface active agent using an extruder, molding an unstretched tube, cross-linking the resulting unstretched tube, and stretching the tube, wherein at least a part of the kneading step is carried out at a temperature of not lower than 250° C. and at a shear rate of not less than 50 [1/sec], the stretching step is carried out at a temperature higher than the melting point of the resin, and said ethylene polymer resin is at least one member selected from the group consisting of (i) intermediate density polyethylene; (ii) low density polyethylene; (iii) ethylene-α-olefin copolymer comprising linear low density polyethylene and/or ultra-low density polyethylene; and (iv) mixtures thereof.

7. A heat shrinkable film obtained by the method according to claim 6.

* * * * *